US011067416B2

(12) United States Patent
Haywood

(10) Patent No.: US 11,067,416 B2
(45) Date of Patent: Jul. 20, 2021

(54) SYSTEM FOR INTERROGATING AN INTERFEROMETER, AN INTERFEROMETRIC SYSTEM AND A METHOD FOR INTERROGATING AN INTERFEROMETER

(71) Applicant: H NU PTY LTD, Normanhurst (AU)

(72) Inventor: John Haywood, Mount Elliot (AU)

(73) Assignee: H NU PTY LTD, Normanhurst (AU)

( * ) Notice: Subject to any disclaimer, the term of this patent is extended or adjusted under 35 U.S.C. 154(b) by 0 days.

(21) Appl. No.: 16/768,437

(22) PCT Filed: Nov. 30, 2018

(86) PCT No.: PCT/AU2018/051284
§ 371 (c)(1),
(2) Date: May 29, 2020

(87) PCT Pub. No.: WO2019/104393
PCT Pub. Date: Jun. 6, 2019

(65) Prior Publication Data
US 2020/0386582 A1    Dec. 10, 2020

(30) Foreign Application Priority Data

Nov. 30, 2017  (AU) .................................. 2017904832

(51) Int. Cl.
*G01B 9/02* (2006.01)
*G01D 5/353* (2006.01)
*H04B 10/516* (2013.01)

(52) U.S. Cl.
CPC ..... *G01D 5/35335* (2013.01); *G01B 9/02001* (2013.01); *G01B 9/02007* (2013.01);
(Continued)

(58) Field of Classification Search
CPC ........... G01D 5/35335; G01D 5/35322; G01D 5/35325; G01B 9/02001; G01B 9/02083;
(Continued)

(56) References Cited

U.S. PATENT DOCUMENTS 6,611,337 B1  8/2003  Bassett et al.
7,920,270 B2  4/2011  Chow et al.
(Continued)

OTHER PUBLICATIONS

Kirkendall, Clay K., et al., "Overview of high performance fibre-optic sensing," *J. Phys. D: Appl. Phys.*, vol. 37, pp. R197-R216 (2004).
(Continued)

*Primary Examiner* — Jonathan M Hansen
(74) *Attorney, Agent, or Firm* — Christensen, Fonder, Dardi & Herbert PLLC

(57) ABSTRACT

A system for interrogating an interferometer. The system comprises an optical signals generation system for concurrently generating a plurality of optical signals that each have a modulation parameter that the other of the plurality of optical signals do not have. The optical signals generation system is for optically coupling each of the plurality of optical signals to a plurality of optical ports of the interferometer for ingress of the plurality of optical signals into the interferometer. The system comprises an interferometer output processing system. Also disclosed herein is an interferometric system and a method for interrogating an interferometer.

16 Claims, 3 Drawing Sheets

(52) U.S. Cl.
CPC ..... *G01B 9/02083* (2013.01); *G01D 5/35322* (2013.01); *G01D 5/35325* (2013.01); *H04B 10/516* (2013.01)

(58) Field of Classification Search
CPC .. G01B 9/02007; H04B 10/516; G01C 19/72; G01C 19/66; G01C 19/64
See application file for complete search history.

(56) References Cited

U.S. PATENT DOCUMENTS

| | | | |
|---|---|---|---|
| 9,389,081 B1 * | 7/2016 | Strandjord | G01C 19/72 |
| 9,459,101 B1 * | 10/2016 | Strandjord | G01C 19/72 |
| 2008/0112267 A1 | 5/2008 | Ronnekleiv et al. | |
| 2021/0025708 A1 * | 1/2021 | Strandjord | G01C 19/661 |

OTHER PUBLICATIONS

Bahrampour, Ali Reza, et al., "Optical Fiber Interferometers and Their Applications," Open access peer-reviewed chapter, *Intechopen*, pp. 3-30 (Mar. 21, 2012). Available at: https://www.intechopen.com/books/interferometry-research-and-applications-in-science-and-technology/optical-fiber-interferometer-and-their-applications.

* cited by examiner

SYSTEM FOR INTERROGATING AN INTERFEROMETER, AN INTERFEROMETRIC SYSTEM AND A METHOD FOR INTERROGATING AN INTERFEROMETER

PRIORITY CLAIM

The present application is a National Phase entry of PCT Application No. PCT/AU2018/051284, filed Nov. 30, 2018, which claims the benefit of Australian Patent Application No. 2017904832, filed Nov. 30, 2017, which are incorporated herein by reference, in their entireties.

TECHNICAL FIELD

The disclosure herein generally, but not exclusively, relates to a system for interrogating an interferometer, an interferometric system and a method for interrogating an interferometer.

BACKGROUND

Interferometers, which are devices that exploit the interference of light, are used for applications including but not limited to the detection and measurement of rotation ("optical gyroscopes"), electrical current detection, and the detection of sound propagating in water ("hydrophones").

Interferometers are responsive to an optical phase shaft generated within them by a physical phenomena to be detected or measured. The optical phase shift is experienced by at least one of a plurality of light waves within the interferometer and which may be superimposed external of the interferometer so they interfere. The superimposed plurality of light waves may be detected with a light detector to generate at least one electrical signal. The at least one electrical signal can be processed to determine the optical phase shift.

Imperfections in optical components constituting an interferometer and its ancillary systems, environmental changes, and possibly other factors, may decrease the accuracy and/or precision of values measured using the interferometer.

Interferometers may be passive or active. Active interferometry may overcome problems associated with passive interferometers, however they may not be suitable for all applications, for example current sensing applications.

Some applications of Sagnac fiber interferometers may require fast pulsed optical sources, which may be expensive and require relatively frequent maintenance, and expensive, high speed data acquisition and processing systems.

It is an object of the present invention to overcome, or at least ameliorate, problems in the prior art, and/or provide at least a useful alternative to prior art devices, systems and/or methods.

SUMMARY

Disclosed herein is a system for interrogating an interferometer. The system comprises an optical signals generation system for concurrently generating a plurality of optical signals that each have a different modulation parameter and optically coupling each of the plurality of optical signals to a plurality of optical ports of the interferometer for ingress of the plurality of optical signals into the interferometer. The system comprises an interferometer output processing system configured to determine a plurality of transfer values indicative of the fractional power distribution of each optical signal at each of the plurality of optical ports by exploiting the different modulation parameter of each of the plurality of optical signals, the interferometer output processing system being configured to determine an ingress optical power and an egress optical power at each of the plurality of ports, and further configured to determine an optical phase shift generated within the interferometer using the plurality of transfer values, the ingress optical power and the egress optical power at each of the plurality of optical ports.

In an embodiment, the plurality of optical signals when so generated have different modulation frequencies and the interferometer output processing system is configured to generate the fractional distribution by measuring different frequency components in the plurality of optical signals generated by the different modulation frequencies.

In an embodiment, the plurality of optical signals when so generated have different amplitude modulation frequencies.

In an embodiment, the interferometer output processing system comprises a plurality of frequency-selective filters each being selective of one of the different frequency components.

In an embodiment, the plurality of frequency-selective filters comprises a plurality of frequency selective Gaussian finite impulse response filters.

In an embodiment, the optical signals generation system is for generating the plurality of optical signals that each has a different orthogonal digital modulation code.

In an embodiment, one of the plurality of optical signals is not modulated.

In an embodiment, the interferometer output processing system comprises a plurality of 2×2 optical couplers, a plurality of photodetectors operationally coupled to the plurality of 2×2 optical couplers, and a plurality of analogue-to-digital converters operationally coupled to the plurality of 2×2 optical couplers.

In an embodiment, the interferometer comprises a Sagnac interferometer.

In an embodiment, the Sagnac interferometer comprises high-birefringence fiber.

In an embodiment, the high-birefringence fiber comprises spun high-birefringence fiber.

In an embodiment, the interferometer comprises a Michelson interferometer.

In an embodiment, the interferometer output processing system comprises an electronic processor for solving the equations $$\begin{bmatrix} \frac{1}{k_0} \cdot i_1 & \frac{1}{k_3} \cdot i_2 & \frac{1}{k_6} \cdot i_3 \\ \frac{1}{k_4} \cdot i_2 & \frac{1}{k_7} \cdot i_3 & \frac{1}{k_1} \cdot i_1 \\ \frac{1}{k_8} \cdot i_3 & \frac{1}{k_2} \cdot i_1 & \frac{1}{k_5} \cdot i_2 \end{bmatrix} \begin{bmatrix} \rho_0 \\ \rho_+ \\ \rho_- \end{bmatrix} = \begin{bmatrix} o_1 \\ o_2 \\ o_3 \end{bmatrix} \text{ and}$$

$$\phi = \tan^{-1}\left[\frac{1-\cos(2\pi/3)}{2\cdot\sin(2\pi/3)} \cdot \frac{\rho_+ - \rho_-}{\rho_0 - \left(\frac{\rho_+ + \rho_-}{2}\right)}\right].$$

In an embodiment, the optical signals generation system is configured to generate the plurality of optical signals with each having a bandwidth in the range of 10 nm-50 nm.

Disclosed herein is an interferometric system. The interferometric system comprises the system for interrogating an interferometer in accordance with the above disclosure. The system comprises the interferometer. The optical signals generation system is optically coupled to the interferometer for coupling each of the plurality of optical signals when so generated to the plurality of optical ports.

Disclosed herein is a method for interrogating an interferometer. The method comprises concurrently generating a plurality of optical signals that each has a different modulation parameter and optically coupling each of the plurality of optical signals to a plurality of optical ports of the interferometer for ingress of the plurality of optical signals into the interferometer. The method comprises determining a plurality of transfer values indicative of the fractional power distribution of each optical signal at each of the plurality of optical ports by exploiting the different modulation parameter of each of the plurality of optical signals. The method comprises determining an ingress optical power and egress optical power at each of the plurality of optical ports. The method comprises determining an optical phase shift generated within the interferometer using the plurality of transfer values, the ingress optical power at each of the plurality of optical ports and the egress optical power at each of the plurality of optical ports.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF THE EMBODIMENTS

Figure 1:
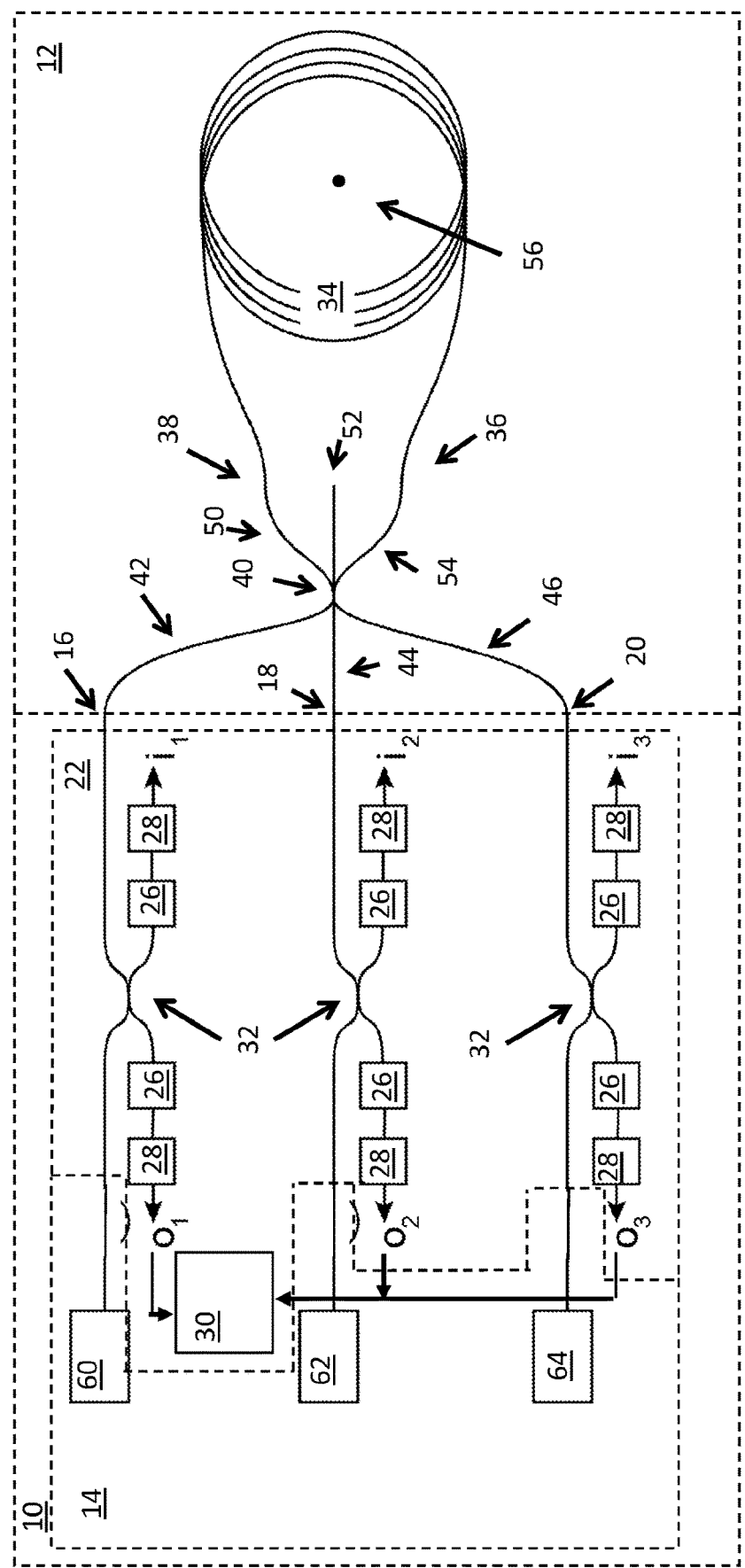
FIG. 1 shows a schematic diagram of an interferometric system.
Figure 2:
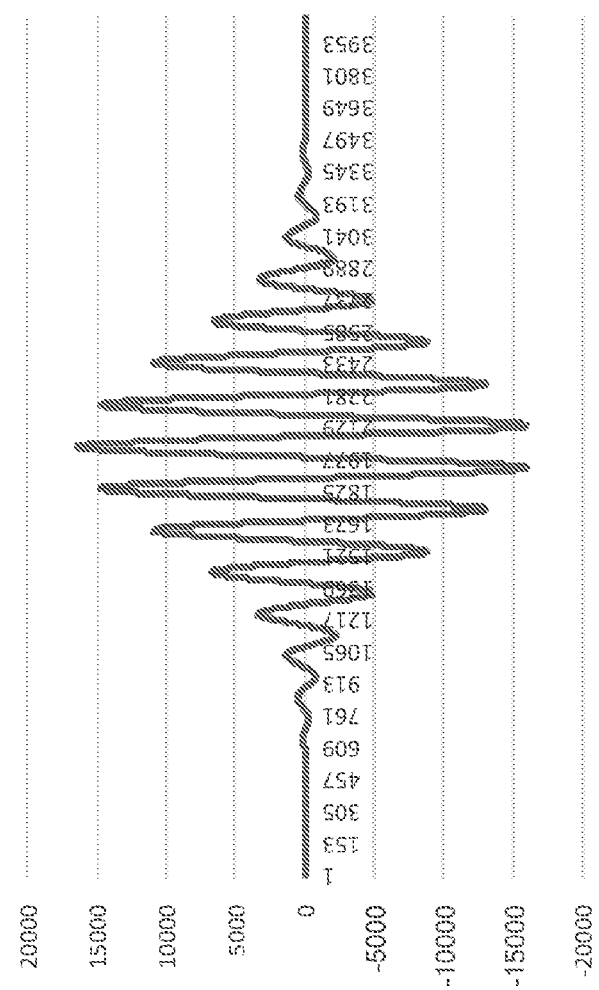
FIG. 2 shows Sample FIR Filter Coefficients used in a filter of the interferometric system of FIG. 1.

FIG. 1 includes a schematic diagram of an embodiment of a system for interrogating an interferometer, the system being generally indicated by the numeral 10 and the interferometer by numeral 12. Systems within the system 10 are enclosed by dashed lines for illustrative purposes. The system 10 comprises an optical signals generation system 14 for concurrently generating a plurality of optical signals that each have a modulation parameter that the other of the plurality of optical signals do not have (that is, each have a different modulation parameter). The optical signals generation system 14 is for optically coupling each of the plurality of optical signals to a plurality of optical ports 16, 18, 20 of the interferometer 12 for ingress of the plurality of optical signals into the interferometer 12. The system 10 comprises an interferometer output processing system 22 configured to determine a plurality of transfer values indicative of the fractional power distribution of each optical signal at each of the plurality of optical ports by exploiting the different modulation parameter (which may be a no applied modulation) of each of the plurality of optical signals, for example measuring the different modulations. The interferometer output processing system 22 is configured to determine an ingress optical power (indicated as $i_1$, $i_2$ and $i_3$) and an egress optical power (indicated as $o_1$, $o_2$ and $o_3$) at each of the plurality of optical ports 16,18,20. The egress optical power, may for example, comprises a power contribution from each of plurality of optical signals. The interferometer output processing system 22 is configured to determine an optical phase shift generated within the interferometer 12 using the plurality of transfer values, the ingress optical power and the egress optical power at each of the plurality of optical ports 16,18,20.

The interferometer output processing system 22 comprises a plurality of 2×2 optical couplers 32 (which can be an optical splitter or an optical combiner) in the form of optical fiber couplers, a plurality of photodetectors 28 in the form of photodiodes operationally coupled to the plurality of 2×2 optical couplers 32, and a plurality of analogue-to-digital (A/D) converters 28 operationally coupled to the plurality of 2×2 optical couplers 32. The photodetector 28 may generally be any suitable photodetector, for example a photomultiplier tube. The output of the A/D converters is received by an electronic processor 30 in the form of a FPGA configured to execute the steps of a method for determining the optical phase shift generated within the interferometer. Generally, any suitable form of electronic processor 30 may be used, for example an ARM processor, an INTEL processor, or an ASIC. The processor receives the values of the ingress optical power and the values of the egress optical powers. The optical powers are generally not an absolute measure of power, but are generally proportional to the actual powers. Intensity may be used instead. Generally, the output of the A/D converters 28 are scalar quantities proportional to the optical powers.

The interferometer 12 comprises a Sagnac interferometer, comprising a coil of high-birefringence fiber 34, the opposite ends 36,38 of which are coupled to 2 output arms 50,54 of a 3×3 optical coupler 40 in the form of 3×3 optical fiber coupler, however a suitable bulk optic coupler may be used in an alternative embodiment. The input arms 42,44, 46 of the 3×3 optical coupler 40 are optically coupled to the 2×2 optical couplers 32. The fiber components including the 3×3 optical coupler, the coil of high-birefringence fiber 34 and the 2×2 optical couplers 32 comprise fiber that is single moded at the wavelength of the plurality of optical signals, which is 1550 nm. While 1550 nm optics is generally easily available and relatively cheap in view of their commodity use in telecommunications, generally the optics may be configured for any suitable optical wavelength, particularly but not exclusively in the wavelength range of 400 nm-2000 nm supported by commercial light emitting diodes, laser diodes, superluminescent diodes (having bandwidth of 10 nm-50 nm, for example however other bandwidths may be used) and rare-earth doped optical fiber sources. Wavelengths outside of these ranges may be used as suitable and possible. The Sagnac interferometer may be used to measure rotation. In an otherwise identical embodiment wherein the Sagnac interferometer may be used to measure current, the high-birefringence fiber 34 comprises spun high-birefringence fiber, in which case the optical phase shift can be generated by an electrical current 56 passing through the coil of spun high-birefringence fiber 34.

The optical signals generation system 14 comprises a plurality of superluminescent diodes 60,62,64, the optical output of two 60,62 of which are amplitude modulated and the optical output of the third 64 is not modulated. Optical output of diode 60 is amplitude modulated at a frequency of 1 KHz, and the optical output of diode 62 is amplitude modulated at 1.5 KHz. Generally, any suitable modulation frequency may be used, however devices for lower modulation frequencies, for example less than 10 KHz, may generally be cheaper than devices for higher modulation frequencies. System losses generally may not significantly change in 1 ms and so 1 KHz modulation may be sufficiently fast. The modulation, however, generally does not limit the rate at which ingress optical powers and output optical powers can be determined. The rate at which the ingress optical power and the output optical power can be sampled, and the optical phase shift generated in the interferometer determined, can be for example, 100 MHz, using sufficiently fast photodetectors 26, A/D converters 28 and electronic processor 30. Generally, any suitable sampling rate may be used, and may be selected for the environment (e.g, higher sampling rates if there are relatively more vibrations).

The plurality of optical signals when so generated by the system 10 have different modulation frequencies and the interferometer output processing system is configured to generate the fractional distribution by measuring different frequency components in the plurality of optical signals generated by the different modulation frequencies. The modulation is amplitude modulation, and so the plurality of optical signal have different amplitude modulation frequencies. The interferometer output processing system 22 comprises a plurality of frequency-selective filters that are each selective of one of the different frequency components. The plurality of frequency-selective filters comprise a plurality of frequency selective Gaussian finite impulse response filters, however generally any suitable form of filter may be used, for example a suitable resister-inductor-capacitor (RCL) filter or suitable LC filter. In an alternative embodiment, the each of the plurality of optical signals is digitally modulated and has a different orthogonal digital modulation code. Generally, any suitable form of modulation and exploitation of the modulation may be used.

In summary of the optical phase measurement:

1. The optical source is split into three signals, or as in the present embodiment 3 separate optical sources in the form of three superluminescent diodes 60,62, 64 generate the three optical signals.

2. The signals 1 and 2 are amplitude modulated with a sinusoid at 1 kHz and 1.5 kHz respectively 3. Signals 1 (1 kHz), 2 (1.5 kHz) and 3 (unmodulated) are launched into arms 1,2 and 3 of the 3×3 coupler 40 respectively. The optical signal which is launched into each arm and the signal which is received from each arm is measured using a 50:50 tap coupler 32. The launched optical powers measured at the output of the tap couplers are $i_1$, $i_2$ and $i_3$. The received optical powers measured at the output of the tap couplers are $o_1$, $o_2$ and $o_3$.

4. The optical powers are converted to electrical signals and digitized at ~1 Msps.

5. The digitized signals are digitally filtered within the electronic processor 30 using a 4096 tap Gaussian FIR filters or other suitable filters to extract the DC, 1 kHz and 1.5 kHz components.

6. The input signal at arm 1 only contains a DC and 1 kHz component—the 1.5 kHz component is zero. Similarly, the input signal at arm 2 only contains a DC and 1.5 kHz component—the 1 kHz component is zero. Similarly, the input signal at arm 3 only contains a DC component—the 1 kHz and 1.5 kHz components are zero.

| Signal | Frequency | Terminology |
|---|---|---|
| $i_1$ | 1 kHz | $i_1^{1\,kHz}$ |
|  | 1.5 kHz | 0 |
|  | DC | $i_1^{DC}$ |
| $i_2$ | 1 kHz | 0 |
|  | 1.5 kHz | $i_2^{1.5\,kHz}$ |
|  | DC | $i_2^{DC}$ |
| $i_3$ | 1 kHz | 0 |
|  | 1.5 kHz | 0 |
|  | DC | $i_3^{DC}$ |

| Signal | Frequency | Terminology |
|---|---|---|
| $o_1$ | 1 kHz | $\gamma_{1,1}$ |
|  | 1.5 kHz | $\gamma_{1,2}$ |
|  | DC | $\gamma_{1,3}$ |
| $o_2$ | 1 kHz | $\gamma_{2,1}$ |
|  | 1.5 kHz | $\gamma_{2,2}$ |
|  | DC | $\gamma_{2,3}$ |
| $o_3$ | 1 kHz | $\gamma_{3,1}$ |
|  | 1.5 kHz | $\gamma_{3,2}$ |
|  | DC | $\gamma_{3,3}$ |

7. The 1 kHz output component from arm 1 (due to the 1 kHz input at arm 1) is called $\gamma_{1,1}$ 8. The 1.5 kHz output component from arm 1 (due to the 1.5 kHz input at arm 2) is called $\gamma_{1,2}$ 9. The transfer value, from (input at) arm 1 to (output at) arm 1 can be calculated as:

$$\frac{\gamma_{1,1}}{i_1^{1kHz}}$$

10. Similarly:

| Input | Output | Transfer value |
|---|---|---|
| 1 | 2 | $\dfrac{\gamma_{2,1}}{i_1^{1\,kHz}}$ |
| 1 | 3 | $\dfrac{\gamma_{3,1}}{i_1^{1\,kHz}}$ |
| 2 | 1 | $\dfrac{\gamma_{1,2}}{i_2^{1.5\,kHz}}$ |
| 2 | 2 | $\dfrac{\gamma_{2,2}}{i_2^{1.5\,kHz}}$ |
| 2 | 3 | $\dfrac{\gamma_{3,2}}{i_2^{1.5\,kHz}}$ |

11. Because the input signals at $i_1$ and $i_2$ contain a DC component as well as the sinusoidal modulation, it is necessary to remove the DC components from these inputs before the transfer value due to the input at arm 3 is calculated.

| Input | Output | Transfer Value |
|---|---|---|
| 3 | 1 | $\tau_{1,3} = \dfrac{\gamma_{1,3} - \frac{\gamma_{1,1}}{i_1^{1\,kHz}} \cdot i_1^{DC} - \frac{\gamma_{1,2}}{i_2^{1.5\,kHz}} \cdot i_2^{DC}}{i_3^{DC}}$ |
| 3 | 2 | $\tau_{2,3} = \dfrac{\gamma_{2,3} - \frac{\gamma_{2,1}}{i_1^{1\,kHz}} \cdot i_1^{DC} - \frac{\gamma_{2,2}}{i_2^{1.5\,kHz}} \cdot i_2^{DC}}{i_3^{DC}}$ |
| 3 | 3 | $\tau_{3,3} = \dfrac{\gamma_{3,3} - \frac{\gamma_{3,1}}{i_1^{1\,kHz}} \cdot i_1^{DC} - \frac{\gamma_{3,2}}{i_2^{1.5\,kHz}} \cdot i_2^{DC}}{i_3^{DC}}$ |

12. These corrections are only necessary because we have chosen to use DC as the input at arm 3. If we had chosen to modulate this input at, say, 2 kHz, then the transfer value from input at arm 3 would follow the same form as for the other two inputs.

13. We will use the notation $\tau_{n,m}$ for the transfer value from input m to output n.

It can be shown that, for a Sagnac interferometer with an optical coupler with small imperfections, the geometric means such as $$\sqrt[3]{\tau_{2,1} \cdot \tau_{3,2} \cdot \tau_{1,3}}$$

are equal to first order of small quantities to the value of $\tau_{2,1}$, $\tau_{3,2}$ or $\tau_{1,3}$ for a Sagnac interferometer with an ideal coupler. We can denote these ideal values as:

$$\rho_0 = \sqrt[3]{\tau_{1,1} \cdot \tau_{2,2} \cdot \tau_{3,3}}$$

$$\rho_+ = \sqrt[3]{\tau_{2,1} \cdot \tau_{3,2} \cdot \tau_{1,3}}$$

$$\rho_- = \sqrt[3]{\tau_{3,1} \cdot \tau_{1,2} \cdot \tau_{2,3}}$$

In the case of the Michaelson interferometer, the ideal values are:

$$\rho_0 = \sqrt[3]{\tau_{2,1} \cdot \tau_{1,2} \cdot \tau_{3,3}}$$

$$\rho_+ = \sqrt[3]{\tau_{2,3} \cdot \tau_{3,2} \cdot \tau_{1,1}}$$

$$\rho_- = \sqrt[3]{\tau_{3,1} \cdot \tau_{1,3} \cdot \tau_{2,2}}$$

In the case of the Sagnac interferometer, the ratio of the ideal values to the actual values can be calculated:

$$k_0 = \frac{\rho_0}{\tau_{1,1}} = \sqrt[3]{\frac{\tau_{2,2} \cdot \tau_{3,3}}{(\tau_{1,1})^2}}$$

$$k_1 = \sqrt[3]{\frac{\tau_{3,2} \cdot \tau_{1,3}}{(\tau_{2,1})^2}}$$

$$k_2 = \sqrt[3]{\frac{\tau_{1,2} \cdot \tau_{2,3}}{(\tau_{3,1})^2}}$$

and similarly for $k_3$, $k_4$, $k_5$, $k_6$, $k_7$ and $k_8$. These ratios can be used as correction factors to relate the actual values to the ideal values. These correction factors depend only on the network losses and the coupler transfer function, and they will vary only slowly with time and temperature. This slow variation allows for averaging of these values with a long time constant to reduce noise in the measurement.

Three simultaneous equations which relate the launched powers, correction factors, and the ideal interferometer transfer function to the returned optical intensities can be constructed:

$$\begin{bmatrix} \frac{1}{k_0} \cdot i_1 & \frac{1}{k_3} \cdot i_2 & \frac{1}{k_6} \cdot i_3 \\ \frac{1}{k_4} \cdot i_2 & \frac{1}{k_7} \cdot i_3 & \frac{1}{k_1} \cdot i_1 \\ \frac{1}{k_8} \cdot i_3 & \frac{1}{k_2} \cdot i_1 & \frac{1}{k_5} \cdot i_2 \end{bmatrix} \begin{bmatrix} \rho_0 \\ \rho_+ \\ \rho_- \end{bmatrix} = \begin{bmatrix} o_1 \\ o_2 \\ o_3 \end{bmatrix}$$

These equations can be solved by the processor using Kramer's rule for the ideal interferometer transfer functions $\rho_0$, $\rho_+$ and $\rho_-$.

Finally, the phase shift within the interferometer can be determined by solving within the electronic processor 30 the equation:

$$\phi = \tan^{-1}\left[\frac{1 - \cos(2\pi/3)}{2 \cdot \sin(2\pi/3)} \cdot \frac{\rho_+ - \rho_-}{\rho_0 - \left(\frac{\rho_+ + \rho_-}{2}\right)}\right]$$

The FPGA is configured to solve the equations. In the case of another electronic processor, the other electronic processor comprises non-transitory processor readable tangible media including program instructions which when executed by the other electronic processor causes the other electronic processor to solve the equations. The other electronic processor may be loaded with a computer program for instructing the other electronic processor, which when executed by the other electronic processor causes the processor to solve the equations.

Figure 3:
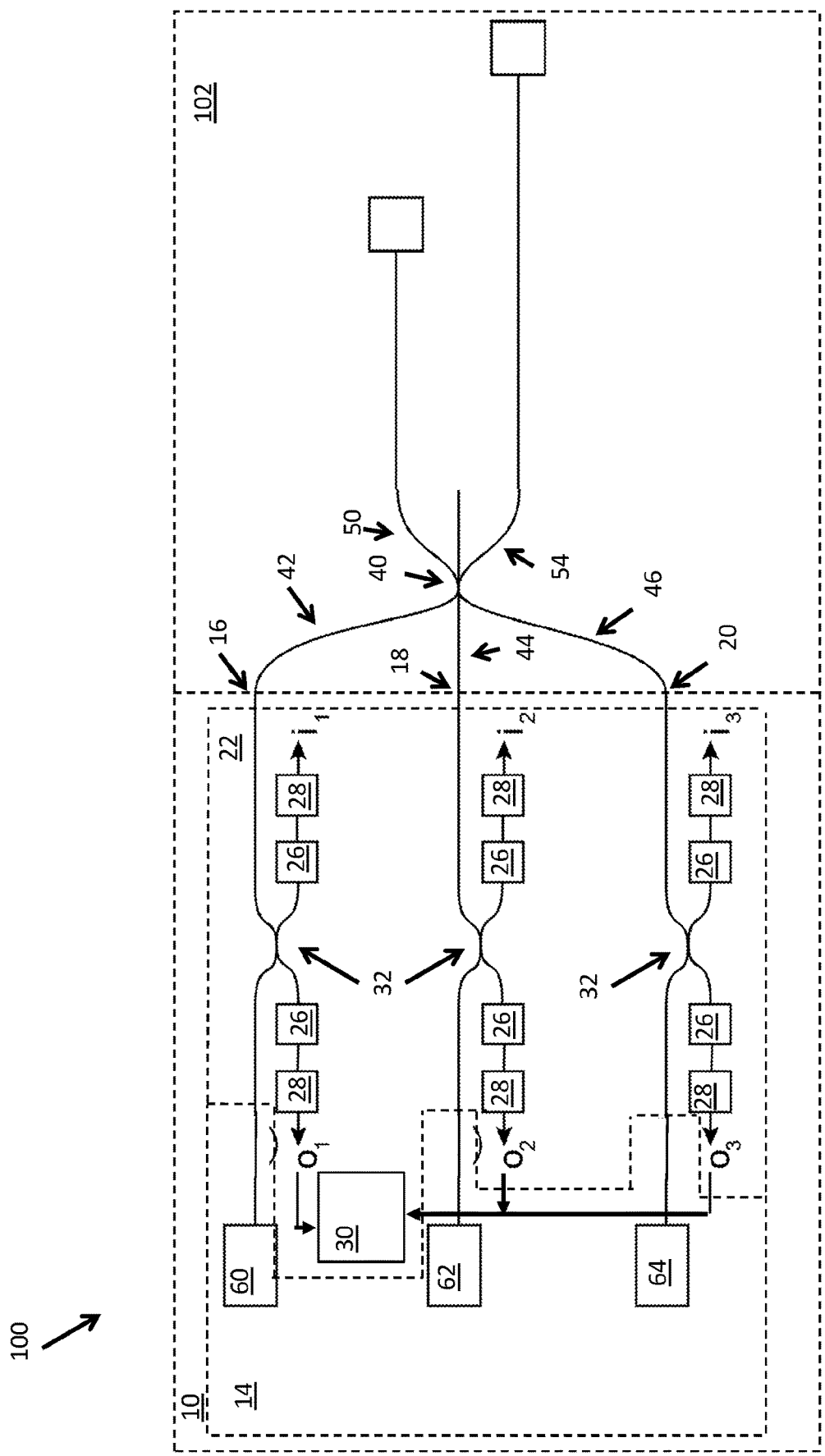
FIG. 3 includes a schematic diagram of another embodiment of an interferometric system.

FIG. 1 also shows an interferometric system comprising the system 10 and interferometer 12. FIG. 3 shows a similar interferometric system 100 where parts having similar and/or identical form and/or function are similarly numbered, however the Sagnac interferometer 12 is replaced with a fiber Michelson interferometer 102.

A method for interrogating an interferometer will now be described with reference to FIGS. 1 and 3. The method comprises the step concurrently generating a plurality of optical signals that each has different modulation parameters and optically coupling each of the plurality of optical signals to a plurality of optical ports 16,18,20 of the interferometer 12, 102 for ingress of the plurality of optical signals into the interferometer 12,102. The method comprises the step of determining a plurality of transfer values indicative of the fractional power distribution of each optical signal at each of the plurality of optical ports by exploiting the different modulation parameters of each of the plurality of optical signals. The method comprises determining an ingress optical power and egress optical power at each of the plurality of ports. The method comprising the step of determining an optical phase shift generated within the interferometer 12, 102 using the plurality of transfer values, the ingress optical power at each of the plurality of optical ports 16,18,20 and the egress optical power at each of the plurality of optical ports 16,18,20.

Variations and/or modifications may be made to the embodiments described without departing from the spirit or ambit of the invention. The present embodiments are, therefore, to be considered in all respects as illustrative and not restrictive. Reference to a feature disclosed herein does not mean that all embodiments must include the feature.

Now that embodiments have been described, it will be appreciated that some embodiments have some of the following advantages.

Passive interferometric techniques may be used, which may be preferable in some applications, for example electrical current sensing.

Accurate and precise measurements may be made at relatively high measurement rates.

Relatively inexpensive and simple designs and components may be used.

Calibration may be performed at a relatively low rate, commensurate with the rate environmental changes for example, while measurement may be repeated at a relatively high rate.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A system for interrogating an interferometer, the system comprising:
    an optical signals generation system for concurrently generating a plurality of optical signals that each have a different modulation parameter and optically coupling each of the plurality of optical signals to a plurality of optical ports of the interferometer for ingress of the plurality of optical signals into the interferometer; and
    an interferometer output processing system configured to determine a plurality of transfer values indicative of the fractional power distribution of each optical signal at each of the plurality of optical ports by exploiting the different modulation parameter of each of the plurality of optical signals, the interferometer output processing system being configured to determine an ingress optical power and an egress optical power at each of the plurality of ports, and further configured to determine an optical phase shift generated within the interferometer using the plurality of transfer values, the ingress optical power and the egress optical power at each of the plurality of optical ports.

2. The system defined by claim 1 wherein the plurality of optical signals when so generated have different modulation frequencies and the interferometer output processing system is configured to generate the fractional distribution by measuring different frequency components in the plurality of optical signals generated by the different modulation frequencies.

3. The system defined by claim 2 wherein the plurality of optical signals when so generated have different amplitude modulation frequencies.

4. The system defined by claim 2, wherein the interferometer output processing system comprises a plurality of frequency-selective filters each being selective of one of the different frequency components.

5. The system defined by claim 4 wherein the plurality of frequency-selective filters comprises a plurality of frequency selective Gaussian finite impulse response filters.

6. The system defined by claim 1 wherein the optical signals generation system is for generating the plurality of optical signals that each has a different orthogonal digital modulation code.

7. The system defined by claim 1, wherein one of the plurality of optical signals is not modulated.

8. The system defined by claim 1, wherein the interferometer output processing system comprises a plurality of 2×2 optical couplers, a plurality of photodetectors operationally coupled to the plurality of 2×2 optical couplers, and a plurality of analogue-to-digital converters operationally coupled to the plurality of 2×2 optical couplers.

9. The system defined by claim 1, wherein the interferometer comprises a Sagnac interferometer.

10. The system defined by claim 9 wherein the Sagnac interferometer comprises high-birefringence fiber.

11. The system defined by claim 10 wherein the high-birefringence fiber comprises spun high-birefringence fiber.

12. The system defined by claim 1, wherein the interferometer comprises a Michelson interferometer.

13. The system defined by claim 1, wherein the interferometer output processing system comprises an electronic processor for solving the equations $$\begin{bmatrix} \frac{1}{k_0} \cdot i_1 & \frac{1}{k_3} \cdot i_2 & \frac{1}{k_6} \cdot i_3 \\ \frac{1}{k_4} \cdot i_2 & \frac{1}{k_7} \cdot i_3 & \frac{1}{k_1} \cdot i_1 \\ \frac{1}{k_8} \cdot i_3 & \frac{1}{k_2} \cdot i_1 & \frac{1}{k_5} \cdot i_2 \end{bmatrix} \begin{bmatrix} \rho_0 \\ \rho_+ \\ \rho_- \end{bmatrix} = \begin{bmatrix} o_1 \\ o_2 \\ o_3 \end{bmatrix} \text{ and}$$

$$\phi = \tan^{-1}\left[\frac{1-\cos(2\pi/3)}{2\cdot\sin(2\pi/3)} \cdot \frac{\rho_+ - \rho_-}{\rho_0 - \left(\frac{\rho_+ + \rho_-}{2}\right)}\right].$$

14. The system defined by claim 1, wherein the optical signals generation system is configured to generate the plurality of optical signals with each having a bandwidth in the range of 10 nm-50 nm.

15. An interferometric system comprising:
    the system for interrogating an interferometer defined by claim 1; and the interferometer;
    wherein the optical signals generation system is optically coupled to the interferometer for coupling each of the plurality of optical signals when so generated to the plurality of optical ports.

16. A method for interrogating an interferometer, the method comprising the steps of:
    concurrently generating a plurality of optical signals that each has a different modulation parameter and optically coupling each of the plurality of optical signals to a plurality of optical ports of the interferometer for ingress of the plurality of optical signals into the interferometer; and
    determining a plurality of transfer values indicative of the fractional power distribution of each optical signal at each of the plurality of optical ports by exploiting the different modulation parameter of each of the plurality of optical signals;
    determining an ingress optical power and egress optical power at each of the plurality of optical ports; and
    determining an optical phase shift generated within the interferometer using the plurality of transfer values, the ingress optical power at each of the plurality of optical ports and the egress optical power at each of the plurality of optical ports.

* * * * *